US009241121B2

(12) United States Patent
Rudolph

(10) Patent No.: US 9,241,121 B2
(45) Date of Patent: Jan. 19, 2016

(54) PROGRAMS OF INTEREST PRESENTATION APPARATUS, SYSTEMS, AND METHODS

(75) Inventor: Daniel L. Rudolph, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1364 days.

(21) Appl. No.: 11/961,873

(22) Filed: Dec. 20, 2007

(65) Prior Publication Data

US 2009/0165054 A1 Jun. 25, 2009

(51) Int. Cl.
| | |
|---|---|
| *G06F 3/00* | (2006.01) |
| *G06F 13/00* | (2006.01) |
| *H04N 5/445* | (2011.01) |
| *H04N 5/781* | (2006.01) |
| *H04N 21/442* | (2011.01) |
| *H04N 21/45* | (2011.01) |
| *H04N 21/466* | (2011.01) |
| *H04N 21/475* | (2011.01) |
| *H04N 21/84* | (2011.01) |
| *H04N 21/482* | (2011.01) |
| *H04N 21/426* | (2011.01) |

(52) U.S. Cl.
CPC ........... *H04N 5/44543* (2013.01); *H04N 5/781* (2013.01); *H04N 21/44222* (2013.01); *H04N 21/4532* (2013.01); *H04N 21/4667* (2013.01); *H04N 21/4668* (2013.01); *H04N 21/4755* (2013.01); *H04N 21/4826* (2013.01); *H04N 21/84* (2013.01); *H04N 21/4263* (2013.01); *H04N 21/4828* (2013.01)

(58) Field of Classification Search
USPC ................ 725/37–59, 68, 100, 131, 139, 151
See application file for complete search history.

(56) References Cited

U.S. PATENT DOCUMENTS

| | | | |
|---|---|---|---|
| 6,005,561 A | 12/1999 | Hawkins et al. | 345/327 |
| 6,438,752 B1 | 8/2002 | McClard | 725/46 |

(Continued)

FOREIGN PATENT DOCUMENTS

| | | |
|---|---|---|
| EP | 2017724 A1 | 1/2009 |
| JP | 2000-293539 A | 10/2000 |
| WO | 02/25939 A2 | 3/2002 |

OTHER PUBLICATIONS

Office Action (with English Translation), cited in corresponding Chinese Application No. 200810172327.1, issued Apr. 14, 2010, 6 pages.

(Continued)

*Primary Examiner* — Yassin Alata
(74) *Attorney, Agent, or Firm* — Seed IP Law Group PLLC

(57) ABSTRACT

Various embodiments present information about programs of interest. Some embodiments provide electronic program guides based on previously viewed programs. In some cases, an electronic program guide generator ("EPGG") generates an electronic program guide for a designated time period, the electronic program guide including information about one or more scheduled programs, based on the one or more scheduled programs each having at least one attribute that matches an attribute of a program that was previously viewed at a time of day corresponding to the designated time period. The generated electronic program guide may then be presented on a presentation device. Another embodiment provides information about one or more programs that are related to a designated program of interest.

20 Claims, 10 Drawing Sheets

(56) References Cited

U.S. PATENT DOCUMENTS

| | | | |
|---|---|---|---|
| 6,637,029 B1 * | 10/2003 | Maissel et al. | 725/46 |
| 6,813,775 B1 | 11/2004 | Finseth et al. | 725/46 |
| 7,065,777 B2 | 6/2006 | Inoue | 725/39 |
| 7,690,012 B2 * | 3/2010 | Luehrs | 725/28 |
| 2002/0059642 A1 | 5/2002 | Russ et al. | 725/135 |
| 2002/0112237 A1 | 8/2002 | Kelts | 725/39 |
| 2002/0129368 A1 | 9/2002 | Schlack et al. | 725/46 |
| 2002/0188947 A1 | 12/2002 | Wang et al. | |
| 2003/0020744 A1 | 1/2003 | Ellis et al. | 345/723 |
| 2003/0084448 A1 | 5/2003 | Soundararajan | 725/46 |
| 2003/0106058 A1 | 6/2003 | Zimmerman et al. | 725/46 |
| 2003/0145326 A1 | 7/2003 | Gutta et al. | 725/46 |
| 2003/0226146 A1 | 12/2003 | Thurston et al. | 725/46 |
| 2004/0203639 A1 * | 10/2004 | Ozer et al. | 455/414.1 |
| 2005/0160456 A1 | 7/2005 | Moskowitz | |
| 2006/0041904 A1 | 2/2006 | Lee | 725/28 |
| 2006/0280046 A1 | 12/2006 | Togashi et al. | 369/30.01 |
| 2007/0118866 A1 | 5/2007 | Chen | 725/87 |
| 2007/0169148 A1 | 7/2007 | Oddo et al. | 725/46 |
| 2007/0174862 A1 | 7/2007 | Kushida et al. | |
| 2007/0266407 A1 | 11/2007 | Yum | 725/58 |
| 2009/0158341 A1 | 6/2009 | Miller | 725/46 |

OTHER PUBLICATIONS

Extended European Search Report dated Jun. 6, 2011, for EP Application No. EP 11 16 2898, 9 pages.

Office Action (with English Translation) issued in corresponding ROC (Taiwan) Application No. 097137999, issued May 25, 2012, 21 pages.

* cited by examiner 304   302                308
↓ TUESDAY NIGHT – 8:05 PM

| CHANNEL | NUMBER | 8:00 P.M. | 8:30 P.M. | 9:00 P.M. | 9:30 P.M. |
|---|---|---|---|---|---|
| ABC CHANNEL | 101 | XXXXX | XXXXX | POLICE DRAMA MOVE (WITH ACTOR BOB SMITH) | |
| DEF CHANNEL | 102 | COMEDY SERIES 312 | XXXXX | XXXXX | 310 |
| XYZ CHANNEL | 103 | XXXXX | MEDICAL DRAMA SERIES 314 | | XXXXX |
| MOVIE A CHANNEL | 104 | XXXXX | XXXXX | | |
| MOVIE B CHANNEL | 105 | XXXXX | | XXXXX | XXXXX |
| COMIC CHANNEL | 106 | XXXXX | XXXXX | | |

FIG. 3
300

304  302      306   310
↓ TUESDAY NIGHT – 8:05 PM : POLICE DRAMA MOVIE   402

| CHANNEL | NUMBER | 8:00 P.M. | 8:30 P.M. | 9:00 P.M. | 9:30 P.M. |
|---|---|---|---|---|---|
| ABC CHANNEL | 12 | 1ST ALTERNATIVE POLICE DRAMA MOVE (WITH ACTOR BOB SMITH) | | | |
| DEF CHANNEL | 86 | 2ND ALTERNATIVE POLICE DRAMA MOVE (WITH ACTOR DAVE JONES) | | | |
| XYZ CHANNEL | 112 | | | 3RD ALTERNATIVE POLICE DRAMA MOVE | |
| MOVIE 1 CHANNEL | 250 | | 4TH ALTERNATIVE POLICE DRAMA MOVE | | |
| MOVIE 2 CHANNEL | 253 | | | 5TH ALTERNATIVE POLICE DRAMA MOVE | |
| MOVIE 3 CHANNEL | 303 | | | 6TH ALTERNATIVE POLICE DRAMA MOVE | |

TUESDAY NIGHT – 8:05 pm : POLICE DRAMA MOVIE / 402

| CHANNEL | NUMBER | TIME | |
|---|---|---|---|
| ABC CHANNEL | 12 | 8:00 P.M. | 1ST ALTERNATIVE POLICE DRAMA MOVE (WITH ACTOR BOB SMITH) |
| DEF CHANNEL | 86 | 8:00 P.M. | 2ND ALTERNATIVE POLICE DRAMA MOVE (WITH ACTOR DAVE JONES) |
| XYZ CHANNEL | 112 | 8:45 P.M. | 3RD ALTERNATIVE POLICE DRAMA MOVE |
| MOVIE 1 CHANNEL | 250 | 7:00 P.M. | 4TH ALTERNATIVE POLICE ··· DRAMA MOVE |
| MOVIE 2 CHANNEL | 253 | 8:30 P.M. | 5TH ALTERNATIVE POLICE DRAMA MOVE |
| MOVIE 3 CHANNEL | 303 | 8:30 P.M. | 6TH ALTERNATIVE POLICE DRAMA MOVE |

TUESDAY - MONDAY NIGHTS (1 WEEK) ACTOR "Bob Smith"   602 / 402

| CHANNEL | NUMBER | DATE | TIME | | 9:00 P.M. | 9:30 P.M. |
|---|---|---|---|---|---|---|
| ABC CHANNEL | 12 | TUE | 8:00 P.M. | 1ST ALTERNATIVE MOVE (WITH ACTOR BOB SMITH) | | |
| LMN CHANNEL | 86 | WED | 8:00 P.M. | 2ND ALTERNATIVE MOVE (WITH ACTOR BOB SMITH) | | |
| OPQ CHANNEL | 112 | WED | 8:00 P.M. | 1ST TV SPECIAL (WITH ACTOR BOB SMITH) | | |
| RST CHANNEL | 250 | WED | 7:00 P.M. | 1ST TV SERIES (WITH ACTOR BOB SMITH) | | |
| MOVIE 4 CHANNEL | 253 | FRI | 8:30 P.M. | 3RD ALTERNATIVE MOVE (WITH ACTOR BOB SMITH) | | |
| | | | | | | |

TUE – MON (1 WEEK)        "COMEDY SERIES" OR "POLITICAL COMEDY"  /702

| CHANNEL | NUMBER | DATE | TIME | |
|---|---|---|---|---|
| ABC CHANNEL | 12 | TUE | 11:00 P.M. | COMEDY SERIES REPEAT |
| LMN CHANNEL | 86 | TUE | 8:00 P.M. | 1$^{ST}$ COMEDY ALTERNATIVE |
| OPQ CHANNEL | 112 | WED | 9:00 P.M. | 2$^{ND}$ COMEDY ALTERNATIVE |
| RST CHANNEL | 250 | FRI | 8:00 P.M. | COMEDY SERIES EPISODE "A" |
| ABC CHANNEL | 253 | SUN | 8:30 P.M. | COMEDY SERIES EPISODE "B" |
| | | | | |

700

800

| Channel | User | StartTime | ViewTime | ProgramID | ... |
|---|---|---|---|---|---|
| 13 | Bob | 2007-03-04-22:32:56 | 45 | 1234 | |
| 43 | -- | 2007-03-05-22:02:51 | 6 | 1009 | |
| 13 | Bob | 2007-03-05-17:22:26 | 2 | 3473 | |
| 234 | Bob | 2007-03-05-08:24:55 | 23 | 2399 | |
| 43 | Alice | 2007-03-05-17:47:03 | 45 | 3634 | |
| 234 | Alice | 2007-03-05-18:32:28 | 107 | 0155 | |
| 13 | -- | 2007-03-07-08:01:43 | 3 | 6703 | |
| 133 | Bob | 2007-03-08-19:29:37 | 1 | 5699 | |
| 110 | Alice | 2007-03-08-22:08:01 | 84 | 3421 | |
| ... | | | | | |

FIG. 10

| Program ID | Title | Director | Genre | Rating | Actors | Keywords | ... |
|---|---|---|---|---|---|---|---|
| 0155 | AAA News | -- | News | PG | -- | national news | |
| 1009 | A First Movie | Director1 | Action | MA | Actor1; Actor2 | aliens | |
| 1234 | A Second Movie | Director1 | Drama | PG | Actor2; | romance; food | |
| 2399 | NNN Crime News | -- | News | MA | -- | crime news | |
| 2501 | A Third Movie | Director2 | Action | MA | Actor 2; Actor4 | crime thriller | |
| 3473 | Monday Night Poker | -- | Sport | G | -- | bar sports | |
| 3634 | Competitive Eating | -- | Sport | PG | -- | food; eating | |
| 5699 | Fishing | -- | Sport | PG | -- | outdoor sport | |
| 6703 | Celebrity News | -- | News | MA | -- | gossip | |
| ... | | | | | | | |

FIG. 11

Favorites:

| Channel | 8:00PM | 8:30PM | 9:00PM | 9:30PM |
|---|---|---|---|---|
| 43 | BBB News | Crime News | Celebrity News | Local News |
| 13 | Soccer | | | Darts |
| 155 | A Third Movie | | A Second Movie | |
| 234 | Ping Pong | Golf Week | Competitive Eating | |
| 1333 | Monday Night Poker | | | Fishing |
| 1355 | Criminal Investigation Documentary | | | Cooking |
| ... | | | | |

FIG. 12

PROGRAMS OF INTEREST PRESENTATION APPARATUS, SYSTEMS, AND METHODS

TECHNICAL FIELD

The technical field relates to programming content for receiving devices and, more particularly, to apparatus, systems and methods for presenting information about programs of interest and, more particularly, to providing electronic program guides based on previously viewed programs.

BRIEF SUMMARY

Apparatus, systems and methods for presenting information about programs of interest are disclosed. In one embodiment, a receiving device for presenting information about available programming is provided. The receiving device comprises a memory; an electronic program guide generator stored on the memory that is configured, when executed, to store one or more attributes of a plurality of broadcast video programs that have been viewed on a presentation device; and for each of multiple time periods, identify one or more of the plurality of broadcast video programs that have been viewed on the presentation device at a time of day corresponding to the time period; and select a set of one or more future programs to be broadcast, each of the set of one or more future programs scheduled for broadcast during the time period and having at least one attribute that matches one of the stored attributes of one of the identified one or more broadcast video programs that have been viewed on the presentation device; and at a current time corresponding to one of the multiple time periods, present an electronic program guide for the corresponding time period on the presentation device, the electronic program guide presenting scheduling information for the selected set of one or more future programs for the corresponding time period; and a video processing system operable to execute the electronic program guide generator.

In another embodiment, a method for presenting information about available programming is provided. The method comprises storing one or more attributes of a plurality of broadcast video programs that have been viewed on a presentation device; selecting, for a first time period, a first set of one or more future programs to be broadcast, each of the first set of one or more future programs scheduled for broadcast during the first time period and having at least one attribute that matches one of the stored attributes of one of the plurality of broadcast video programs that have been viewed on the presentation device; and presenting an electronic program guide for the first time period on the presentation device, the electronic program guide presenting scheduling information for the selected first set of one or more future programs.

BRIEF DESCRIPTION OF THE DRAWINGS

The components in the drawings are not necessarily to scale relative to each other. Like reference numerals designate corresponding parts throughout the several views.

FIG. 3 is a diagram illustrating an example electronic program guide.

FIGS. 4-7 are diagrams illustrating example related program electronic program guides.

FIG. 8 is a diagram illustrating an example presented menu that allows a viewer to select search attributes.

FIG. 10 is a table illustrating example usage information tracked by a second example embodiment of an electronic program guide generator.

FIG. 11 is a table illustrating example program information used by a second example embodiment of an electronic program guide generator.

FIG. 12 is an example electronic program guide generated by a second example embodiment of an electronic program guide generator.

DETAILED DESCRIPTION

Figure 1:
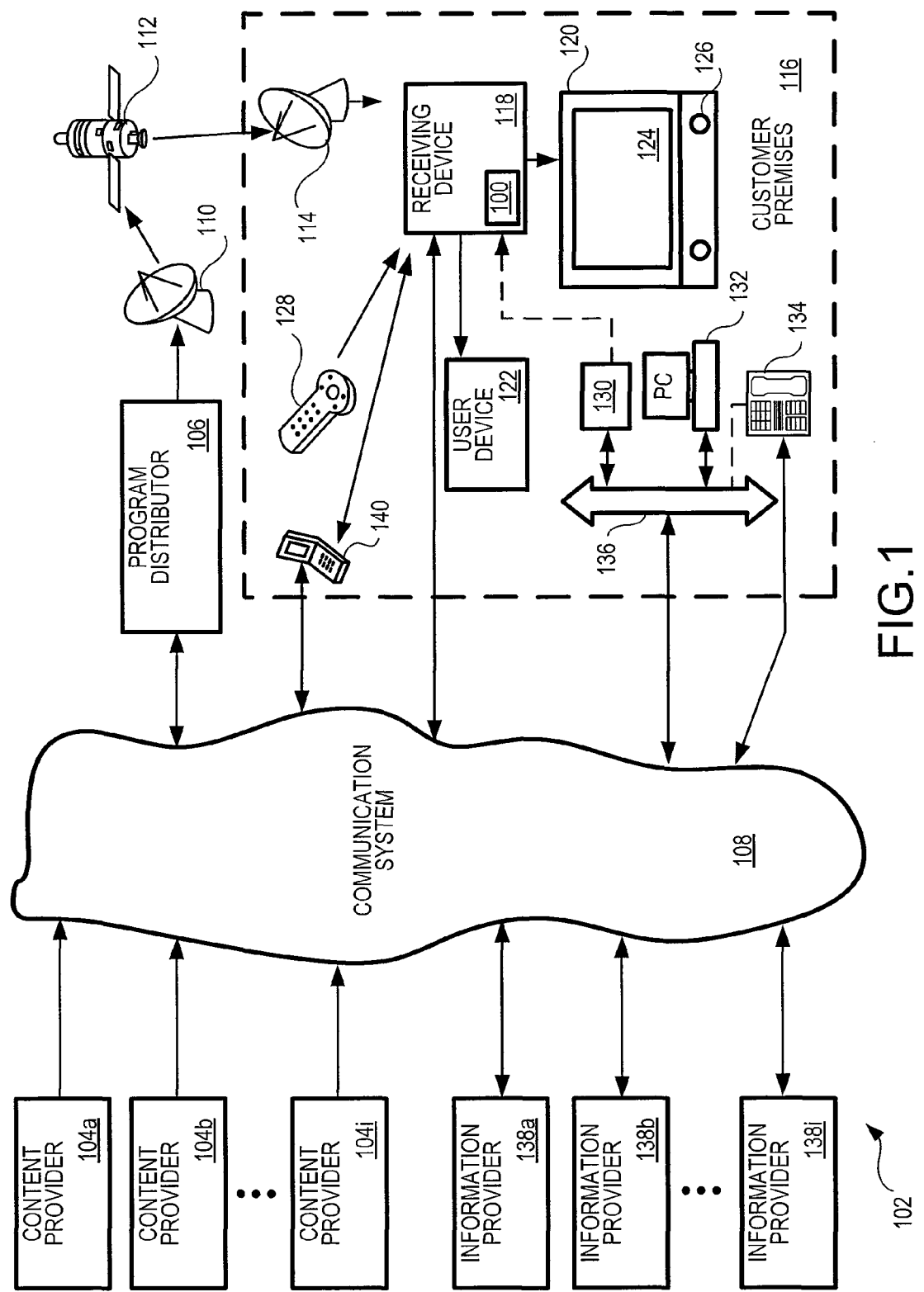
FIG. 1 is a block diagram illustrating an example communication system in which embodiments of an electronic program guide generator may be implemented.

Electronic Program Guides (EPGs) are used to indicate available programming to a viewer. Often, such programming is indicated by a "channel" indicia (such as a television channel "name" and/or an identifying channel number), program title, and times of presentation. EPGs may also be configured as a selectable menu such that a viewer of the EPG may selectively highlight a program of interest for viewing, recording, or to learn more about the program of interest. For example, the EPG may provide a very brief description of the nature of a highlighted program. Some embodiments may even present a sub-EPG that provides additional descriptive information.

Some embodiments may facilitate the automatic generation of electronic program guides based on user viewing habits. The techniques may include tracking usage information with respect to a receiving device and/or presentation device. Tracking usage information may include, for example, recording information about video programs selected for viewing via a receiving device. Usage information may also include time and/or date of viewing, duration of viewing, identity of the viewer, an indication of the program viewed, etc. Then, an electronic program guide may be generated based on the tracked usage information. Generating an electronic program guide may include automatically filtering, arranging, and/or otherwise processing a set of indications of previously viewed programs based on various criteria, such as viewing frequency, viewing recency, viewing duration, viewing time, channel category, user identity, etc. The generated electronic program guide may include indications of one or more programs, based at least in part on the usage information. In at least some embodiments, some of the described techniques are performed by an electronic program guide generator ("EPGG"), described below.

In addition, some embodiments described herein are operable to present additional information about programs of interest. In some embodiments, additional information may be presented about other programs that are related in some manner to a program of interest. Such additional information may be presented to a viewer such that the viewer can appreciate the availability of other programs that are related in some manner to the program of interest. Further, the "channel" indicia, program title, and/or times of presentation of the related programs may be presented to the viewer.

For example, the viewer may be interested in a specific actor that is featured in a program of interest. Some embodiments may identify other programs with the actor and then present to the viewer the "channel" indicia, program titles, and/or times of presentation of related programs also featuring or having the actor. As another example, the subject matter of the program of interest may relate to hospital dramas. Some embodiments may identify other programs with that topical subject (hospital dramas) and then present to the viewer the "channel" indicia, program titles, and/or times of presentation of related programs. The related programs may be the same or different episodes of the program series pertaining to the selected program of interest. Further, some embodiments may identify other different series altogether. As will be described below, some embodiments are operable to present information identifying at least one related program corresponding to an attribute associated with the selected program.

FIG. 1 is an overview block diagram illustrating an example communication system 102 in which embodiments of an electronic program guide generator may be implemented. It is to be appreciated that FIG. 1 is just one example of a communications system and that the various embodiments discussed herein are not limited to such described systems. Communication system 102 can include a variety of communication systems and can use a variety of communication media including, but not limited to, satellite wireless media.

An overview of the example communication system 102 in which embodiments of a EPGG 100 may be implemented is now generally described. A plurality of content providers 104a-104i provide program content, such as television content or audio content, to a distributor, such as the program distributor 106. Content providers 104a-104i may include television stations which provide local or national television programming, special content providers which provide premium based programming or pay-per-view programming, or radio stations which provide audio programming.

Some EPGs are operable to present related programming by themes, such as disclosed in the co-pending application entitled "Method and Apparatus for Displaying Electronic Program Guide Information" (Ser. No. 10/939,065, U.S. publication number 2005/0160456, filed on Sep. 9, 2004), which is incorporated in its entirety by reference herein. However, the number of programs, and/or the relevant time period of program availability, is typically limited in a theme based EPG due to screen size limitations of the display 124 of the presentation device 120.

In contrast, some embodiments of the EPGG 100 are operable to present programming that is related to a program of interest. For example, if a financial program is selected from a "news" theme based EPG, embodiments of the EPGG 100 would present a related program EPG further identifying additional financial news programming that is currently available for presentation and/or that is available for presentation at a future time. Thus, the viewer is able to see a greater variety of "financial news" programming that have attributes relating to financial news.

As noted above, the number of programs and/or the relevant time period of program availability is typically limited in a theme based EPG due to size limitations of the display 124 of the presentation device 120. Embodiments of the related program EPG generated by the EPGG 100 advantageously display availability of programming related to a program of interest. Thus, the related programming presented by embodiments of the related program EPG cover a broader range of "channel" indicia, times, and/or days as compared to a theme based EPG.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, cable systems, fiber optic systems, microwave systems, asynchronous transfer mode (ATM) systems, frame relay systems, digital subscriber line (DSL) systems, radio frequency (RF) systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

The received program content is converted by one or more devices (not shown) as necessary at the program distributor 106 into a suitable signal that is communicated (i.e., "uplinked") by one or more antennas 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antennae 114 are operable to receive signals from a single satellite 112. Other types of receiver antennae 114 are operable to receive signals from multiple satellites 112 and/or from terrestrial based transmitters.

The receiver antenna 114 can be located at a customer premises 116. Often, the receiver antenna 114 is of a parabolic shape that may be mounted on the side or roof of a structure. Other antenna configurations can include, but are not limited to, phased arrays, wands, or other dishes. Examples of customer premises 116 include a residence, a business, or any other suitable location operable to receive signals from satellite 112.

Television service providers provide their customers a multitude of audio/video and/or data programming (hereafter, collectively and/or exclusively "programming"). Such programming is often provided by use of a receiving device 118 (FIG. 1) communicatively coupled to a presentation device 120 configured to receive the programming.

The received signal is communicated from the receiver antenna 114, typically over a hard-wire connection, to a receiving device 118. Receiving device 118 is a conversion device that converts, also referred to as formatting, the received signal from antenna 114 into a signal suitable for communication to a presentation device 120, a user device 122, or another device operable to couple to the receiving device 118.

Receiving device 118 interconnects to one or more communications media or sources (such as a cable head-end, satellite antenna, telephone company switch, Ethernet portal, off-air antenna, or the like) that provide the programming.

The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and the user device 122.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television (TV) or the like, and/or to a user device 122.

It is to be appreciated that presentation device 120 may be any suitable device operable to present a program having video information and/or audio information. Examples of a presentation device 120 include, but are not limited to, a television (TV), a personal computer (PC), a sound system receiver, a digital video recorder (DVR), a compact disk (CD) device, a game system, or the like. Presentation devices 120 employ a display 124, one or more speakers 126, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

User device 122 may be any suitable device that is operable to receive a signal from the receiving device 118 and record the received program. Non-limiting examples of user device 122 include optical media recorders, such as a compact disk (CD) recorder, a digital versatile disc or digital video disc (DVD) recorder, a digital video recorder (DVR), a personal video recorder (PVR), and personal computers (PCs).

Interface between the receiving device 118 and a user (not shown) may be provided by a hand-held remote device 128. Remote 128 typically communicates with the receiving device 118 using a suitable wireless medium, such as infrared (IR), RF, or the like. Other devices (not shown) may also be communicatively coupled to the receiving device 118 so as to provide user instructions. Non-limiting examples include game device controllers.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network (LAN) system, or the like. One or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

The above description of the communication system 102 and the customer premises 116, and the various devices therein, is intended as a broad, non-limiting overview of an example environment in which various embodiments of the EPGG 100 may be implemented. The communication system 102, and the various devices therein, may contain other devices, systems and/or media not specifically described herein.

Figure 2:
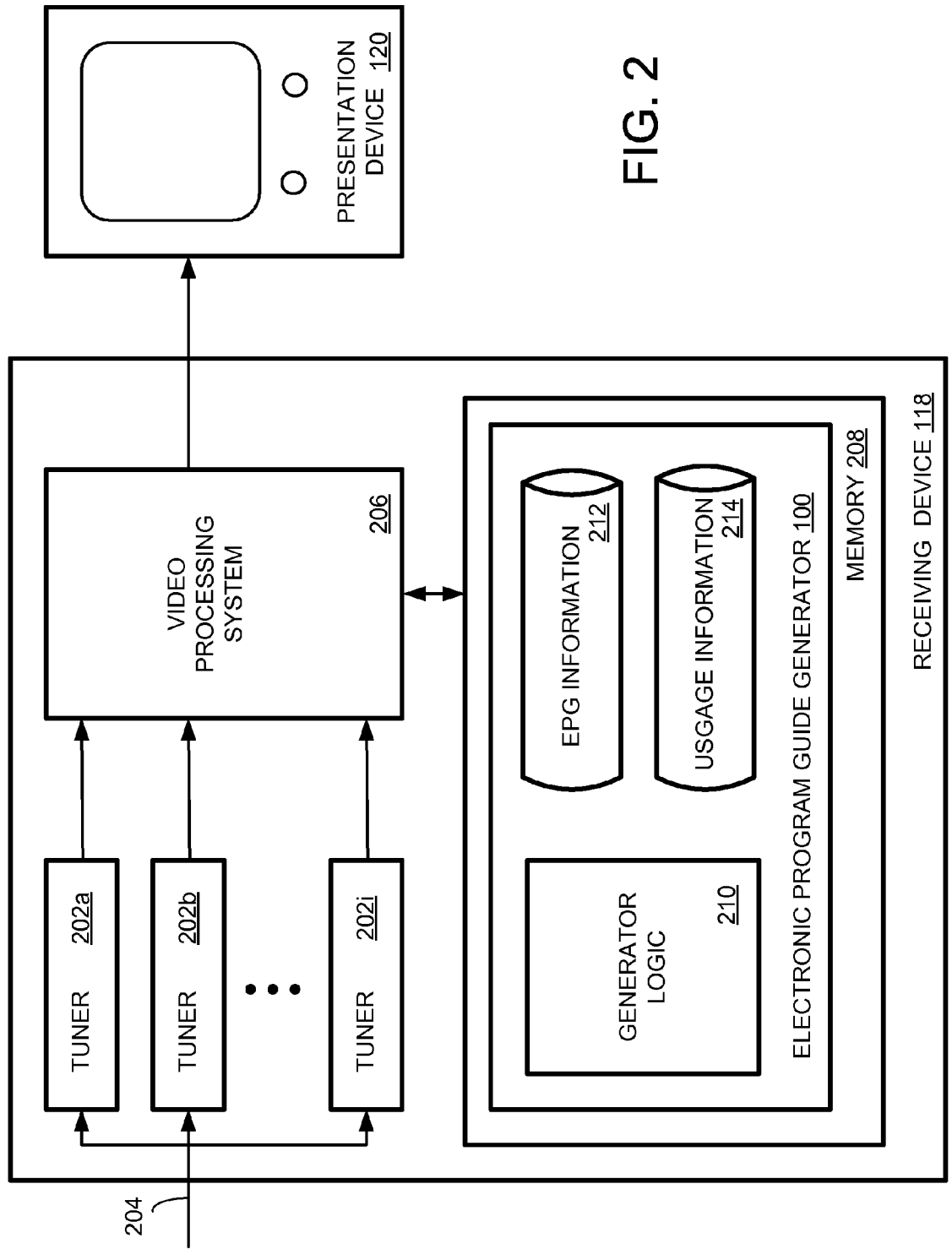
FIG. 2 is an overview block diagram illustrating an example embodiment of an electronic program guide generator.

FIG. 2 is an overview block diagram illustrating an example electronic program guide generator ("EPGG") 100. The receiving device 118 includes a plurality of tuners 202a-202i, a video processing system 206, and memory 208. In one example embodiment, a plurality of tuners 202a-202i receive programming information from the receiver antenna 114 or from another source of programming, via connection 204. Tuners 202a-202i may each tune to a particular carrier signal in order to receive programming carried over that carrier signal. Some embodiments may include a single tuner 202a.

Video processing system 206 receives one or more programs from the tuners 202a-i, and further processes the received programming into streams of video, audio, and/or other information for presentation on one or more presentation devices 120, and/or communication to one or more user devices 122, such as a DVR. Video processing system 206 may further perform a variety of functions during the processing of a program which is ultimately communicated to the presentation devices 120 or user devices 122. Non-limiting examples include decryption of secure programs, demodulation of information in the received programs, formatting the information in the output into a digital or analog signal, preparing an electronic programming guide (EPG), or providing various "trick" or "special" functionality that is displayed to the user in a selectable format. Other functions not described above may also be performed by the video processing system 206.

The memory 208 includes the EPGG 100. The EPGG 100 automatically generates electronic program guides and other information about programs of interest. The EPGG 100 includes generator logic 210, EPG information data repository 212, and usage information data repository 214. EPG information data repository 212 contains information about past, present, and future programming so that the video processing system 206 may present an EPG on presentation device 120. It is appreciated that program information is periodically communicated from the program distributor 106 (FIG. 1) to the receiving device 118 so that a current database or other data repository for a schedule of upcoming programs is maintained. Usage information data repository 214 contains information related to the usage of the receiving device 118, such as a history of programs that have been viewed via the receiving device 118.

A viewer can cause the receiving device 118 to generate and then communicate the EPG to the presentation device 120 which presents the EPG to the viewer. Preferably, the EPG information data repository 212 includes such information as program titles, presentation dates and times, and metadata pertaining to the program.

In the illustrated embodiment, the EPGG 100 is implemented primarily in software. In particular, the generator logic 210 comprises one or more software modules containing instructions that, when executed, perform the functions of the EPGG 100. The video processing system 206 includes a processor that is configured to execute the instructions, and process the data, of the EPGG 100.

The data repositories 212 and 214 may be implemented in various ways. For example, the usage information data repository 214 may be a relational database system, such that the generator logic 210 may perform at least some of its functions by respectively making updates to and queries of the database. In another embodiment, one or more of data repositories 212 and 214 may be implemented in other ways, such as flat files, directory structures, etc.

Furthermore, in some embodiments, some or all of the components of the EPGG may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The EPGG 100 may be implemented and/or structured in various other ways. In particular, the functions of the EPGG 100 may be performed by a different arrangement of components and/or modules of the receiving device 118, including a greater or lesser number of components. For example, the usage information data repository 214 may actually reside in, or be part of, the EPG information data repository 212. Also, the generator logic 210 may be implemented as multiple software modules, rather than a single module as illustrated.

In one embodiment, described with reference to FIGS. 3-9, below, the EPGG 100 manages the generation and presentation of related electronic program guides that provide users with information about programs that are related to an indicated program of interest.

In another embodiment, described with reference to FIGS. 10-13, below, the EPGG 100 manages the generation and presentation of electronic program guides based on viewing habits of one or more users of the receiving device 118. In particular, the generator logic 210 may track usage information that reflects the operational state of the receiving device over time. For example, when a user selects a program for viewing via the receiving device 118, the generator logic 210 will store a record in the usage information data repository 214 reflecting the occurrence of this event. The recorded usage information will include certain attributes of the program that has been viewed. This may include information such as an indication of the program selected for viewing (e.g., a program identifier, a title, a name, and the like), date, time, user identity, and the like. The recorded usage information will also include certain metadata or attributes of programs that have been viewed. The attributes which may be stored for a program that is being viewed may include such features as the year the program or film was first released, the names of the actors, the studio that made the program, the genre, the type of program (e.g., sit com, western, news program, drama, comedy, and the like), the maturity rating (e.g., G, PG, PG-13, R, and the like), quality rating (e.g., a number of stars or other measure of quality), key words from the plot line, and the like. At least some of these attributes may be communicated with or separately from the program itself, and may be stored in a data repository on the receiving device 118, such as data repository 212 and/or 214. The data repository 214 may in some embodiments store these and accumulate a history and pattern of the attributes of viewed programs over time. Additional details regarding usage information are provided with reference to FIG. 10, below.

Over time, the usage information data repository 214 will accumulate a history of user interactions, which can be utilized by the generator logic 210 to automatically generate an electronic program guide, based on the interests of one or more users that access programming via the receiving device 118. In particular, the generator logic 210 may process, filter, and/or arrange the information stored in the usage information data repository 214 to determine one or more programs that may be of interest to a user of the receiving device 118, based on the past interactions of the user with the receiving device 118. For example, the generator logic 210 may determine one or more programs that meet one or more specified criteria, such as those types of programs that have attributes that are at least similar to attributes of programs that have been viewed during a particular time period, that are commonly viewed by a particular user, etc.

The electronic program guide information determined by the generator 202 may be provided directly to the receiving device 118 for display on the presentation device 120, stored in the EPG information data repository 212, and/or provided to some other component/device. The EPGG 100 may determine electronic program guide information in response to the occurrence of one or more specified events, such as an elapsed amount of time (e.g., once per hour), a received user input event (e.g., a user request to view an EPG), a received command from the program distributor 106, etc.

FIG. 3 is a diagram illustrating an example EPG 300. The EPG includes a portion 302 which indicates the current date and time, here illustrated as Tuesday night at 8:05 p.m. A portion 304 of the EPG 300 indicates channel "names" which may be selectable by the viewer. Portion 306 indicates channel numbers associated with a channel name. A plurality of portions 308 of the EPG 300 indicate times of program availability for presentation. A plurality of portions 310 indicate programs that are currently available or will be available at the times designated on the EGP 300. Programs are preferably identified by program title such that the viewer appreciates which program the EPG is identifying.

During presentation of programming to a viewer, the viewer may be interested in viewing a presented EPG 300. Preferably, the viewer actuates a button, key, or other actuator residing on the remote 128 (FIG. 1) to select presentation of the EPG 300. Preferably, the button, key, or other actuator residing on the remote 128 has a predefined focus associated with the EPG 300.

For example, the "ABC channel" on channel number 101 at 9:00 p.m. is scheduled to present a movie entitled "Police Drama Movie" where the actor "Bob Smith" is a featured actor, as indicated at portion 310 of the EPG 300. The "DEF channel" on channel number 102 is presently scheduled to present a series entitled "Comedy Series" as indicated at portion 312 of the EPG 300. The "XYZ channel" on channel number 103 is presently scheduled to present a series entitled "Medical Drama Series" as indicated at portion 314 of the EPG 300. Portions identified by an "XXXXX" are intended to generically represent program titles of other programs.

As is appreciated by one skilled in the art, the remote 128 may be used by the viewer to set the focus on a presented EPG 300 to a program of interest. Thus, the viewer may select the "Comedy Series" for presentation and/or recording by selecting the portion 312 of the EPG 300. In some embodiments, the viewer may select the "Medical Drama Series" for future presentation and/or recording by selecting the portion 314 of the EPG 300. Similarly, the viewer may select the "Police Drama Movie" for future presentation and/or recording by selecting the portion 310 of the EPG 300. The selection designates the selected program as a program of interest.

The viewer may be further interested in viewing a related program EPG which indicates related programming corresponding to the present program highlighted on EPG 300. Accordingly, the viewer actuates the same, or a different, button, key, or other actuator residing on the remote 128 (FIG. 1) to select presentation of a related program EPG.

Some embodiments preferably have a dedicated button, key, or other actuator residing on the remote 128 with a predefined focus to the related program EPG. Accordingly, the related program EPG corresponding to a program that is being currently presented is then presented upon actuation of the button, key, or other actuator residing on the remote 128. Here, in response to receiving a request to present a related program EPG, the currently presented program is the program of interest. That is, a viewer can go directly to the related program EPG without going through the additional step of having the EPG 300 first presented.

A related program EPG presents one or more programs which are available for presentation that correspond to a program of interest. As noted above, the program of interest may be a program highlighted and/or selected on the EPG 300, or may be a program currently presented by receiving device 118 (FIG. 1). The generator logic 210 is retrieved and executed by the video processing system 206, or another suitable processor (not shown), to identify related programs corresponding to the selected program of interest.

Related programs are identified based upon analysis of program attributes residing in the EPG data 210. As noted above, the EPG data 210 contains attribute information associated with the program. For example, a program attribute may be the title of the program. Also, the EPG data 210 contains metadata that includes other attribute information pertaining to the corresponding program. For example, the metadata may include attribute information pertaining to the subject matter of the program. The metadata may include a genre identifier that categorizes the program into one or more predefined topical categories. Other metadata information may include attributes such as actor names, related programs (which may be indicated in a related program EPG), year of production, location of production, etc. It is appreciated that the above-described list of attributes are not limiting. That is, any program information contained in the EPG may be used as an attribute.

EPG data 210 includes attribute information for programs available for presentation up through some predefined period of time, such as ten days, two weeks, or the like. Accordingly, embodiments of the EPGG 100 search through the EPG data 210 and identify related programs corresponding to the program of interest.

As noted above, the information in the EPG data 210 includes one or more attributes associated with the program of interest. One or more of the attributes of the program of interest are compared with attributes associated with the information for other programs that are included in the EPG data 210. When the attributes of a program in the EPG data 210 matches, agrees with, is equivalent to, or otherwise corresponds to an attribute of the program of interest, that program is identified as a related program. Embodiments of the EPGG 100 then assemble information for the identified related programs in some convenient order, described below, and then generate a related program EPG which is then presented to the viewer.

Embodiments of the EPGG 100 may present related programs using a menu based system which allows the viewer to select one or more of the related programs for current or future presentation and/or recording much like the above-described EPG 300. Related program EPGs may be presented as a relatively smaller sized "pop-up" menu or the like, or may be presented in a manner that substantially fills the viewing area of the presentation device. Several non-limiting examples of related program EPGs are provided below.

FIG. 4 illustrates an example related program EPG 400 corresponding to the program of interest entitled "Police Drama Movie" identified at portion 402 of the related program EPG 400. Here, it is assumed that the attributes "police" and "drama" (or "police drama") are used to search through the EPG data 210 (FIG. 2) to identify related programs. Thus, the portion 402 indicates the attribute used to identify related programs.

The example related program EPG 400 presents a plurality of six related programs that are currently available for presentation or are scheduled for presentation at a future time. The related programs are identified by channel names, channel numbers, and scheduled presentation times as described above. Here, the related programs are presented in order of channel number. Other criteria may be used to define presentation order of the related programs on a related program EPG.

As noted in FIG. 4, the related programs are identified based upon the attributes of "movie," "police," and "drama" (or "police drama"). For example, channel 12 indicates an alternative police drama movie that also has actor Bob Smith.

Channel 86 indicates an alternative police drama movie that has a different actor, Dave Jones.

It is appreciated that the above-described related program EPG 400 has an inherent limitation imposed by the size of display 124 on the presentation device 120 (FIG. 1). Because of the limited size of the presentation area of display 124, the amount of information that may be presented on a single screen shot for the related program EPG 400 is limited by a number of time periods that are displayable. For example, the third alternative movie on channel 112 does not begin until approximately 8:45 p.m., and accordingly, that period before the beginning of presentation is indicated as a blank region. (Alternatively, the program scheduled for presentation prior to the third alternative movie could be displayed by embodiments of the EPGG 100. However, presentation of a non-related program may be distracting and confusing to the viewer.)

FIG. 5 illustrates another example related program EPG 500 corresponding to the program of interest entitled "Police Drama Movie" identified at portion 402 of the related program EPG 500. Again, it is assumed that the attributes "police" and "drama" (or "police drama") are used to search through the EPG data 210 (FIG. 2) to identify related programs. Here, presentation times are separately indicated at portion 502 for each related program. Thus, the viewer appreciates that on Tuesday night, the listed related programs may be selected for presentation.

In this example related program EPG 500, the viewer may then instruct the EPGG 100 to page to the next day, or to a selected day or date. For example, if remote 128 includes a button, key, or other actuator identified with an indicia of "Next" or the like, selection of the "Next" button or actuator would cause the related program EPG 500 to scroll to the next day such that related programs for the next day are presented. It is appreciated that many different ways of specifying days and/or dates for which related programs are presented are possible.

FIG. 6 illustrates another example related program EPG 600 corresponding to the program of interest with actor "Bob Smith" identified at portion 402 of the related program EPG 500. Here, it is assumed that the attribute "Bob Smith" is used to search through the EPG data 210 (FIG. 2) to identify related programs. The related program EPG 600 at portion 602 indicates that the relevant period for which related programs have been identified for a one week period is between Tuesday and the next Monday.

Here, presentation days and times are separately indicated at portions 604 and 606, respectively, for each related program. Thus, the viewer appreciates that on next Wednesday night, the listed related programs scheduled for presentation at 8:00 p.m. with the "$2^{nd}$ Alternative Movie" and/or the "$1^{st}$ TV Special" titles may be selected for future viewing and/or recording. Here, the related program EPG 600 presents movies, program specials, and series with actor Bob Smith.

Alternatively, the day of presentation may be indicated with a date of presentation. For example, if the current date is Tuesday Oct. 9, 2007, then the corresponding related programs scheduled for presentation at 8:00 p.m. on Wednesday with the "$2^{nd}$ Alternative Movie" and/or the "$1^{st}$ TV Special" titles may be indicated with the date of Oct. 10, 2007 (or other suitable corresponding indicia).

Also, since a limited number of related programs with attributes corresponding to "Bob Smith" were identified in the EPG data 210 (FIG. 2), a bottom portion of the related program EPG 600 is left blank. Alternatively, the related program EPG 600 could be sized to display only the related programs. Furthermore, when the number of identified related programs exceeds the number of related programs that may be presented on a related program EPG, a button, key, or other actuator on the remote 128 may be used to scroll down or page down so that other related programs may be displayed by the related program EPG.

Figures 7, 8:
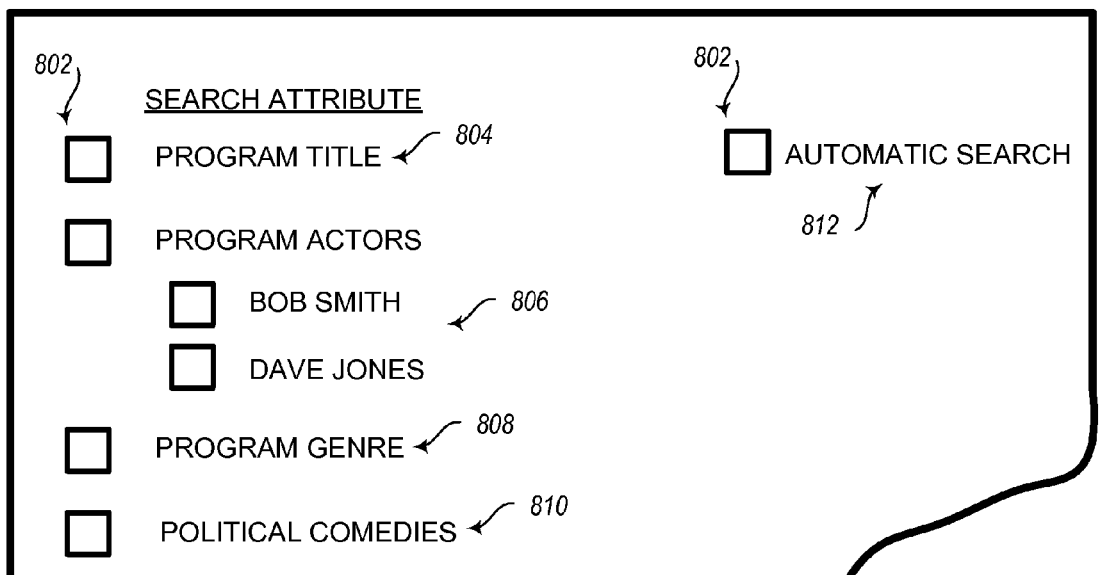

FIG. 7 illustrates another example related program EPG 700 corresponding to the program of interest of "Comedy Series" identified at portion 312 of the related program EPG 300 (FIG. 3). Further, it is assumed that the EPG data 210 metadata indicates that the program is a political comedy. Here, it is assumed that the attribute of the title "Comedy Series" or the attribute "political comedy" are used to search through the EPG data 210 (FIG. 2) to identify related programs. The related program EPG 700 at portion 702 indicates that the relevant period for which related programs have been identified for a one week period is between Tuesday and the next Monday.

The related program EPG 700 indicates that a repeat of the program of interest is presentable on Tuesday at 11:00 p.m. Thus, related programs may include repeat presentations of the program of interest. The programs titled "$1^{st}$ Comedy Alternative" presented at Tuesday 8:00 p.m. on channel 86 and the program titled "$2^{nd}$ Comedy Alternative" presented on Wednesday at 9:00 p.m. on channel 112 are appreciated to be political comedies. The programs titled "Comedy Series Episode 'A'" presented at Friday 8:00 p.m. on channel 250 and the program titled "Comedy Series Episode 'B'" presented on Sunday at 8:30 p.m. on channel 253 are appreciated to be different episodes of the program of interest (the program titled "Comedy Series").

The related program EPGs 400, 500, 600 and 700 described above are intended to illustrate a limited number of presentation formats of a related program EPG. It is appreciated that embodiments of the EPGG 100 are able to identify related programs using one or more attributes, and assemble the identified related programs into a wide variety of formats for a related program EPG.

Similar to selecting a program of interest via EPG 300, the remote 128 may be used by the viewer to set the focus onto a portion of the related program EPG corresponding to a related program. The related program is then presented and/or recorded upon actuation of an appropriate a button, key, or other actuator on remote 128. It is further appreciated that if the selected related program is scheduled for presentation at a future time, the presentation and/or recording would occur at the scheduled time.

Embodiments of the EPGG 100 may be operable to automatically select one of more attributes for identification of related programs. For example, the title and predefined attributes (e.g., genre, actor names, director names, production locations, production dates, etc.) may be used as screening attributes.

Other embodiments may present a menu or the like to the viewer such that the viewer may select attributes used to identify related programs. FIG. 8 illustrates an example presented menu that allows the viewer to select search attributes. The example menu 800 may be automatically presented to the viewer. In other embodiments, such as those which have pre-identified search attributes, the menu 800 may be presented when the viewer actuates a button, key, or other actuator on the remote 128. In other embodiments, the viewer may be presented with a screen that allows automatic attribute searching or manual attribute searching defined by the viewer (in which case, the menu 800 is presented to the viewer).

The example menu 800 includes a plurality of selectable portions 802 that the viewer may select to indicate desired search attributes. For example, the viewer may select an attribute based on program title, as indicated at portion 804 of the menu 800. The viewer may select an attribute based on program actors, such as Bob Smith and/or Dave Jones, as indicated at portion 806 of the menu 800. The viewer may select an attribute based on program genre, as indicated at portion 808 of the menu 800. In some embodiments, the viewer may specify an attribute, as indicated at portion 810 of the menu 800. Attribute specification may be entered using the remote 128. In the example menu 800, the viewer may choose to allow the EPGG 100 to automatically search predefined attributes, as indicated at portion 812 of the menu 800.

It is to be appreciated that the menu 800 is only an example format of a menu for allowing a viewer to specify search attributes used by the EPGG 100 to identify related programs. Other embodiments of the EPGG 100 may use differently formatted menus or have different selectable attributes.

Figure 9:
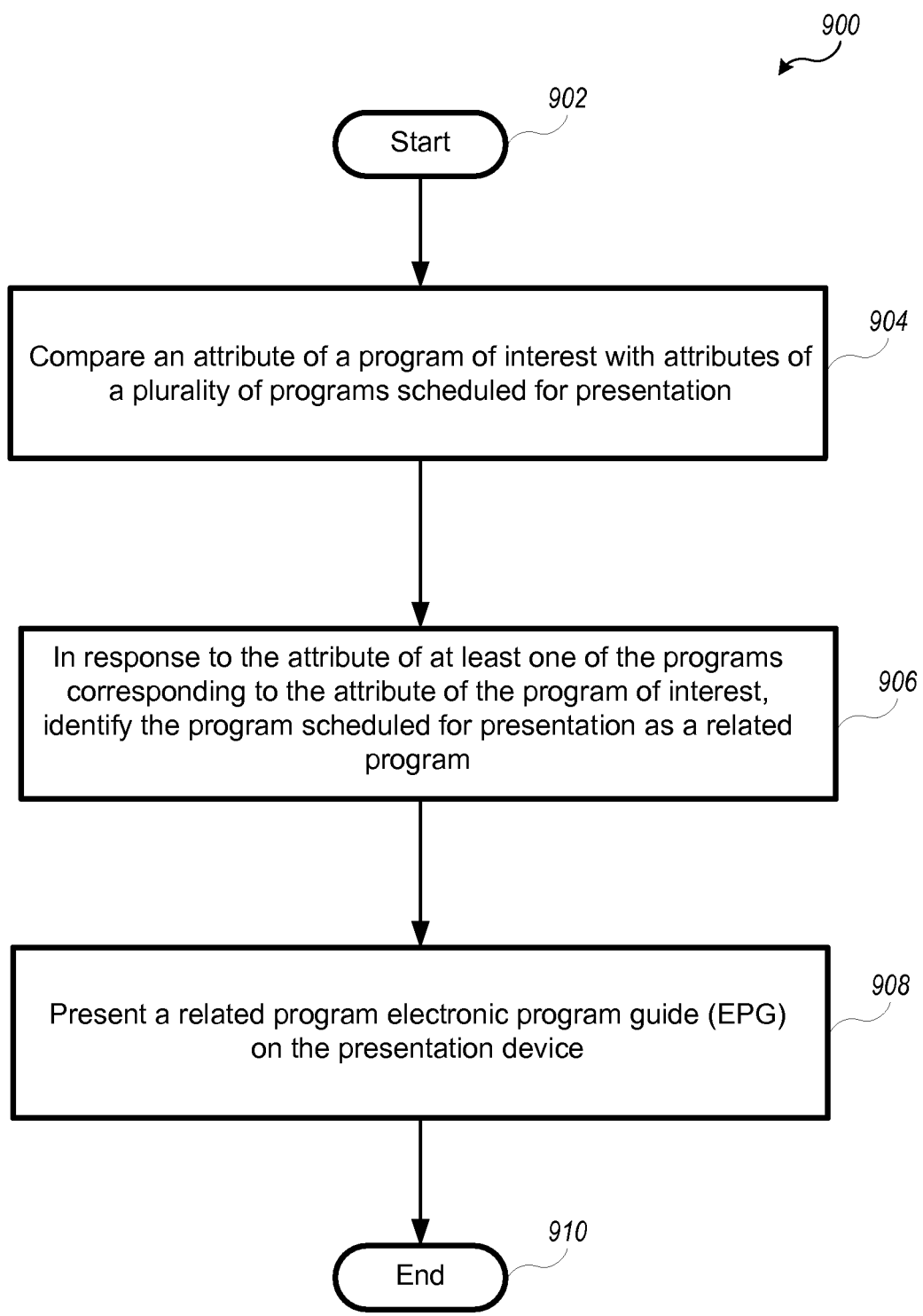
FIG. 9 is a flowchart illustrating a process used by a first example embodiment of an electronic program guide generator.

FIG. 9 is a flowchart 900 illustrating a process used by an embodiment of a EPGG 100 (FIG. 1). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 9, the process 900 is ongoing with operation of the receiving device 118 (FIG. 1), and is illustrated as starting at 902. At 904, an attribute of a program of interest is compared with attributes of a plurality of programs scheduled for presentation on a presentation device. At 906, in response to the attribute of at least one of the programs corresponding to the attribute of the program of interest, the program scheduled for presentation is identified as a related program. At 908, a related program electronic program guide (EPG) is presented on the presentation device, the related program EPG presenting information identifying the related program. The process ends at 910.

As noted above, FIGS. 10-13 illustrate a second embodiment, in which an electronic program guide generator manages the generation and presentation of electronic program guides based on viewing habits of one or more users of the receiving device.

FIG. 10 is a table illustrating example usage information tracked by a second example embodiment of an electronic program guide generator. In particular, FIG. 10 shows a table 1000 having usage information arranged in rows 1004*a*-1004*j* and columns 1002*a*-1002*f*. Each row 1004*a*-1004*j* includes information about a single viewing period, including various attributes such as channel number 1002*a*, user identity 1002*b*, viewing start time 1002*c*, viewing period time 1002*d* in minutes, and program identifier ("ID") 1002*e*. The table 1000 illustrates example usage information that may be stored, for example, in the usage information data repository 206, described with reference to FIG. 2.

The example usage information includes information about multiple viewing periods. For example, row 1004*a* contains a record indicating that a user identified as "Bob" viewed program 1234 on channel 13 starting at 22:32 (10:32 PM) and 56 seconds, on Mar. 4, 2007, for a total of 45 minutes. Row 1004*b* contains a record indicating that an unknown user viewed program 1009 on channel 43 starting at 22:02 (10:02 PM) and 51 seconds, on Mar. 5, 2007, for a total of 6 minutes.

The illustrated embodiment tracks information about which user is viewing particular programming. For example, rows 1004*a*, 1004*c*, 1004*d*, and 1004*h* identify the viewing user as "Bob"; rows 1004*e*, 1004*f*, and 1004*i* identify the viewing user as "Alice"; and rows 1004*b* and 1004*g* indicate that a viewing user was not identifiable, as indicated by "--." Users may be identified in various ways. In some cases, a user may self-identify, such as by indicating their identity prior to a viewing session. In other cases, a user identity may be determined by reference to some other system information. For example, in the context of a personal computer, a user may be identified by reference to the current user that is logged into the personal computer. In other embodiments, users may be identified without knowledge of the user, such as via biometric sensors (e.g., fingerprint detectors) installed on input devices that are configured to automatically identify the user operating the device.

In other embodiments, more or less information may be recorded and/or utilized, as indicated by column 1002*f* and row 1004*j*. For example, some embodiments may not record a program identifier for each viewing period, since that information may be obtained in other ways, such as by reference to program information that provides a mapping between channel, time, and program identifier. In addition, other types of events relating to program viewing and/or device usage may be recorded, such as power on, power off, utilization of subtitles or closed captioning, etc. Furthermore, usage information may be structured in other ways and/or represented using other units. For example, viewing period time 1002*d* may be represented in seconds, rather than minutes. Also, some embodiments may not record viewing period time at all, given that this information may be later computed based on the time difference between consecutive channel selection events.

FIG. 11 is a table illustrating example program information used by a second example embodiment of an electronic program guide generator. In particular, FIG. 11 shows a table 1100 having program information arranged in rows 1104*a*-1104*j* and columns 1102*a*-1102*h*. Each row 1104*a*-1104*j* includes information about a single program, including attributes such as a program identifier ("ID") 1102*a*, a title 1102*b*, a director 1102*c*, a genre 1102*d*, a rating 1102*e*, actors 1102*f*, and keywords 1102*g*. The table 1100 illustrates example program information that may be stored, for example, in the EPG information data repository 206, described with reference to FIG. 2. The illustrated program information may be received from various sources, such as the program distributor 106, a content provider 104, an information provider 138, or the like.

The illustrated embodiment uses the program information of table 1100 to select one or more programs to include in an electronic program guide, based at least in part on the usage information of table 1000. In particular, the illustrated embodiment may provide different electronic program guides for different time periods, based on user viewing patterns during those time periods. In this manner, the EPGG may present electronic program guides that are tailored to a user's viewing habits, such that the user is presented with a view of programming that is related to programming that the user has previously viewed during a given time period.

For example, a user may request an electronic program guide that includes scheduled programs that are related to programs that have been commonly viewed during the morning (4 AM to 10 AM) time period. Based on an analysis of the information in table 1000, the EPGG may determine that programs 2399 and 6703 have been viewed during that time period. Then, the EPGG may generate an EPG for the 4 AM to 10 AM time period that includes those programs based on the program information in table 1100.

In addition, the EPGG may identify one or more programs that are related to previously viewed programs. For example, a user may request an electronic program guide that includes scheduled programs that are related to programs that have been commonly viewed during the 10 PM-2 AM time period. Based on an analysis of the information in table 1000, the EPGG may determine that programs 1009 and 1234 have been viewed during that time period. Then, the EPGG may generate an EPG for the 10-12 PM timer period that includes program 2501, based on the fact that program 2501 has an actor (Actor 2) in common with programs 1009 and 1234, and the fact that program 2501 is of the same genre (Action) as program 1234.

Given a sufficiently large viewing history, it may be the case that many different scheduled programs may appear to be related to previously viewed programs. In such situations, the EPGG may filter, arrange, order, or otherwise process the related programs to present a manageable set of related programs in an EPG. Accordingly, the EPGG may rate or otherwise quantify scheduled programs based on one or more measures of similarity to one or more previously viewed programs. A similarity measure may take into account various factors, such a count of the number of times each attribute of a scheduled program matched a previously viewed program. Another factor may be the time/date when the previously viewed program was viewed, such that a program viewed more recently than another program will have a greater impact on the selection of scheduled programs. A further factor may include weighting attributes associated with programs, such that some attributes have a greater will have a greater impact on the selection of scheduled programs. For example, a genre attribute may be weighted more highly than an actor attribute, such that programs having the same or similar genre would tend to be preferred to those merely having an actor in common. The above-described factors may be user-specified and/or automatically determined. For example, in some embodiments, a user may specify the respective weights of various attributes. In addition, machine learning algorithms may be applied to learn, identify, or otherwise determine factors that correspond to a user's actual interests. Such machine learning techniques may also take into account user feedback, such as by recording a user response to a presented electronic program guide, and using the response to further refine the process of identifying related programs.

In other embodiments, more or less information may be recorded and/or utilized, as indicated by column 1102*h* and row 1104*j*. For example, some embodiments may include multiple different rating systems, such as content-based ratings and quality ratings, as may be provided by various sources, including user feedback.

FIG. 12 is an example electronic program guide generated by a second example embodiment of an electronic program guide generator. In particular, FIG. 12 shows a display of an electronic program guide 1200 that may be displayed, for example, on a presentation device 120, upon a request received from a user. The guide 1200 comprises a table that includes program information arranged in per-channel rows 1204*a*-1204*g* and columns 1202*a*-1202*e*. Each row 1204*a*-1204*g* includes information about a single channel, including a channel number 1202*a*, a first time slot 1202*b*, a second time slot 1202*c*, a third time slot 1202*e*, and a fourth time slot 1202*e*. The displayed electronic program guide 1200 may be interactive, in that it may include user selectable controls, such as buttons, text, links, arrows, and the like, that may be selected by a user to scroll, expand, collapse, or otherwise interact with the electronic program guide 1200.

The electronic program guide 1200 includes information about multiple programs that have been selected based on usage information. For example, the EPGG 100 may process usage information, such as that described with reference to FIG. 10, in order to identify programs that have been previously viewed during the 5 PM to 10 PM time period. Then the EPGG 100 may calculate, for each identified program, a total viewing time. Then, the programs may be ordered in decreasing order of total viewing time and presented as the electronic program guide 1200, such that a program having the highest total viewing time appears at the top of the electronic program guide 1200. In this example, it may be observed that, based on the usage information of table 1000 and the program information of table 1100, the user has previously viewed programs 3473 (Monday Night Poker), 3634 (Competitive Eating), 0155 (AAA News), and 5699 (Fishing) during the 5 PM to 10 PM time period. Accordingly, the EPGG 100 may generate and/or modify the electronic program guide 1200 to include or emphasize at least those programs and/or programs related to those programs. For example, the electronic program guide 1200 includes various news and sports programs, such as BBB News, Soccer, Ping Pong, and Monday Night Poker, based on the fact that the news and sports programs were previously viewed during the time period. Note also that the electronic program guide 1200 includes a program entitled "A Second Movie," based on the fact that this program has a keyword ("food") that matches a keyword of a previously viewed program, Competitive Eating.

As noted, in some embodiments, the programs may be filtered in various ways, such as to only display a specified number of programs, programs viewed by a particular user, programs of a specified category. For example, the order of the listed programs may depend at least in part on one or more measures of similarity between each of the listed programs and one or more previously viewed programs. In addition, the programs are here presented on a channel-by-channel basis, because such a view is familiar to many users. However, in other embodiments, channels may not be represented, and instead an ordered list of programs may be presented.

In some embodiments, a user may specify at least some of the criteria that should be used in generating one or more electronic program guides. For example, a user may specify that a first electronic program guide only include sports programs watched during the last month, ordered based on total viewing time, such that scheduled programs that are related to frequently viewed programs will tend to appear before scheduled programs that are related to infrequently viewed programs. The user may also specify that a second electronic program guide only include family programs watched on Saturday mornings. In this manner, multiple "custom" electronic program guides may be generated that reflect programming of interest to particular members of a given household, where the electronic program guides are populated with programs that are based on actual viewing habits of the household members. As those viewing habits change over time, the electronic program guides will be automatically modified to reflect the changed habits.

In addition, in some embodiments, the electronic program guide 1200 may include at least some related programs based on payments received by, for example, the program distributor 106 from a content provider that provides the recommended channel, so as to serve as targeted, paid program placements. Other types of content, such as targeted product advertisements based on viewing habits, may also be included. For example, a portion of the electronic program guide 1200 may include a banner or other indication of a particular good or service that is related to frequently viewed programming, as determined by the usage information gathered by the EPGG 100.

Furthermore, at least some of the described techniques may be utilized to implement a locking mechanism for a receiving device. For example, a user may specify that an EPG for a particular time of day only reflect programming that is child friendly, based on a maturity rating attribute. The user may then further specify that the EPG act as a lock, such that only programs presented in the EPG are to be presented by the receiving device, such that if a user selects a program that is not included in the EPG, the receiving device will disallow presentation of the selected program.

In addition, a user may in some embodiments specify which programs or types of programs are to be, or not to be, considered for purposes of generating an EPG. For example, a user may specify that the viewing of programs of particular genres and/or maturity ratings is not to be tracked and/or utilized in the determination of an EPG.

Figure 13:
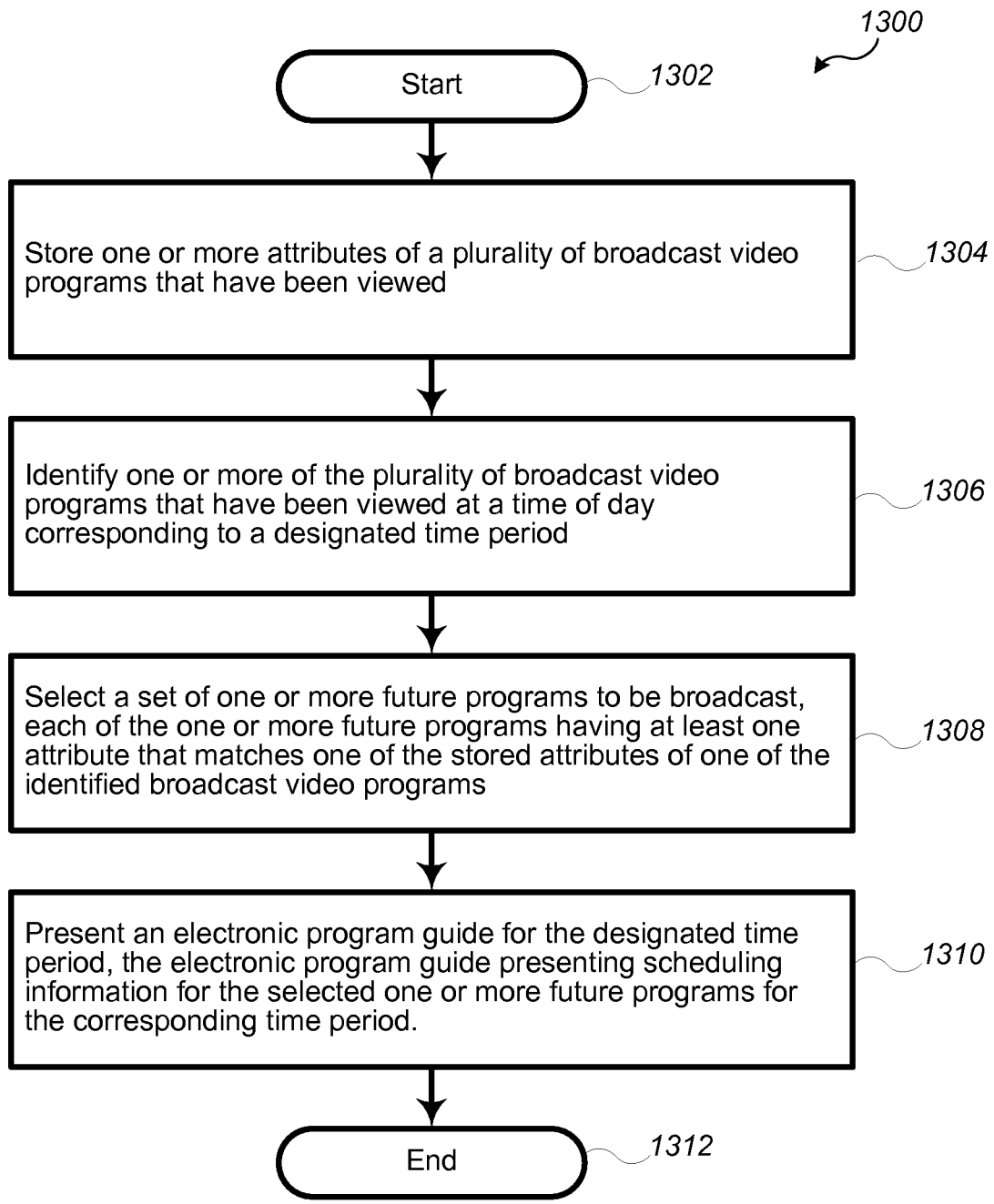
FIG. 13 is a flowchart illustrating a process used by a second example embodiment of an electronic program guide generator.

FIG. 13 is a flowchart illustrating a process used by a second example embodiment of an electronic program guide generator. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted. The process 1300 may be implemented by, for example, but not limited to, one or more hardware, firmware, and/or software modules, components, and/or devices, such as are illustrated in the receiving device 118 described with reference to FIG. 2, such as the generator logic 210 and/or the video processing system 206.

The process 1300 is ongoing with operation of the receiving device 118 (FIG. 1), and is illustrated as starting at 1302. At 1304, the process stores one or more attributes of a plurality of broadcast video programs that have been viewed. Such attributes may include various types of information associated with a program, such as genre, rating, actor, director, producer, keyword, production date, or title. The attributes may be stored in, for example, the usage information data repository 214 described with reference to FIG. 2.

At 1306, the process identifies one or more of the plurality of broadcast video programs that have been viewed at a time of day corresponding to a designated time period. The time period may be designated in various ways. In one embodiment, the process may periodically (e.g., every hour, every day, etc.) automatically determine multiple electronic program guides for various time periods, such as a morning time period, daytime time period, afternoon time period, evening time period, and a late night time period. In other embodiments, the time period may be specified by a user. By identifying programs that have been viewed during the designated time period, the process may assure that a resulting electronic program may tend to reflect or be based on programming choices historically made by a user during the designated time period.

At 1308, the process selects a set of one or more future programs to be broadcast, each of the one or more future programs having at least one attribute that matches one of the stored attributes of one of the identified broadcast video programs. Each program of the selected set of future programs will be similar to at least one of the identified previously viewed programs, in that the future program will match at least one attribute of a program that was previously viewed at a time of day corresponding to the current time period. For example, if a first sporting event (e.g., a basketball game) was viewed yesterday during the designated time period, a second sporting event may be selected as one of the future programs, based on the fact that both programs are related to sports. The matching of attributes may be exact and/or approximate. In exact matching, only identical attributes may be considered matches. In approximate matching, various techniques may be used to determine a degree of similarity between attributes, such as approximate string matching, subtyping of categories, and the like.

At 1310, the process presents an electronic program guide for the designated time period, the electronic program guide presenting scheduling information for the selected one or more future programs for the corresponding time period. The scheduling information for each selected program may include program name, time, channel, and/or other information, such that a user may determine whether they are interested in viewing one or more of the selected programs. At 1312, the process ends.

It is to be appreciated that although the techniques have been here described primarily with reference to providing an electronic program guide based on programs viewed by a user, the described techniques may be used to provide an electronic program guide based on other information about a user's viewing habits. For example, the described techniques may be utilized to determine one or more categories (e.g., comedy, drama, sports, news, etc.) and/or ratings (e.g., quality, maturity level, etc.) of interest based on the viewing habits of one or more users. In addition, such determined information may be utilized for other purposes than preparing and displaying an electronic programming guide, such as for targeted advertisement, recommended programming, etc.

In addition, in some embodiments, the functionality provided by the processes discussed above may be provided in other ways, such as being split among more processes or consolidated into fewer processes. Similarly, in some embodiments illustrated processes may provide more or less functionality than is described, such as when other illustrated processes instead lack or include such functionality respectively, or when the amount of functionality that is provided is altered. In addition, while various operations, actions, and/or activities may be illustrated as being performed in a particular manner and/or in a particular order (e.g., in serial), those skilled in the art will appreciate that in other embodiments the operations may be performed in other orders and in other manners (e.g., in parallel).

It is also appreciated that data objects, representations, and structures discussed herein, such as electronic program guides, usage information, program content, and program information, may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

While various embodiments have been described hereinabove, it is to be appreciated that various changes in form and detail may be made without departing from the spirit and scope of the invention(s) presently or hereafter claimed.

The invention claimed is:

1. A receiving device for presenting information about available programming, comprising:
a memory;
an electronic program guide generator stored on the memory that is configured, when executed, to:

store one or more attributes of a plurality of broadcast video programs that have been viewed on a presentation device;

identify one or more of the plurality of broadcast video programs that have been viewed on the presentation device during a first time period;

identify one or more programs of interest selected for recording and store one or more attributes of the one or more programs of interest that have been selected for recording;

select one or more future programs to be broadcast, each program of the one or more future programs scheduled for broadcast during the first time period, and the selection being made based on determining whether the one or more future programs to be broadcast, other than one of the identified one or more broadcast video programs that have been viewed on the presentation device, has at least one attribute that is the same as one of the stored attributes of one of the identified one or more broadcast video programs that have been viewed on the presentation device during the first time period and determining whether the one or more future programs to be broadcast has at least one attribute that is the same as one of the stored attributes of one of the identified one or more programs of interest that have been selected for recording; and in response to a received user input, provide electronic program guide information for the first time period on the presentation device, the electronic program guide including scheduling information for the selected one or more future programs for the first time period.

2. The receiving device of claim 1 wherein the receiving device is a set-top box operable to receive digital program content from a communications network and to present the received digital program content on the presentation device.

3. The receiving device of claim 1 wherein, for at least one of the selected one or more future programs, the one attribute of the future program is an approximate string match of the one stored attribute of the one of the identified one or more broadcast video programs.

4. The receiving device of claim 1 wherein the stored one or more attributes include at least one of a genre, a rating, an actor, a director, a producer, a keyword, a production date, or a title.

5. A method for presenting information about available programming, comprising:

storing one or more attributes of a plurality of broadcast video programs that have been viewed on a presentation device;

storing one or more attributes of one or more programs of interest that have been selected for recording;

selecting, for a first time period, one or more future programs to be broadcast, each program of the one or more future programs scheduled for broadcast during the first time period, and the selecting based on determining whether the one or more future programs to be broadcast, other than one of the plurality of broadcast video programs that have been viewed on the presentation device, has at least one attribute that is identical to one of the stored attributes of one of the plurality of broadcast video programs that have been viewed on the presentation device and determining whether the one or more future programs to be broadcast has at least one attribute that is identical to one of the stored attributes of the one or more programs of interest that have been selected for recording;

generating an electronic program guide for the first time period for presentation on the presentation device, the electronic program guide including scheduling information for the selected one or more future programs.

6. The method of claim 5 wherein the selecting of the one or more future programs to be broadcast is based at least in part on, for each of the one or more future programs, the one of the plurality of broadcast video programs having been viewed during a time of day that corresponds to the first time period.

7. The method of claim 5 wherein the selecting of the one or more future programs to be broadcast comprises:

identifying at least one of the plurality of broadcast video programs that have been viewed on the presentation device, the at least one broadcast video program having been viewed during a time of day that corresponds to the first time period; and determining, for each program of the one or more future programs, a measure of similarity between the future program and the identified at least one of the plurality of broadcast video programs.

8. The method of claim 7 wherein, for each of the one or more future programs, the determining for each program of the one or more future programs a measure of similarity includes determining whether the one attribute of the future program is identical to the one stored attribute of the plurality of broadcast video programs or identical to the one or more programs of interest that have been selected for recording.

9. The method of claim 5 wherein the method is performed for multiple distinct time periods, and wherein the generated electronic program guide for each of the multiple distinct time periods includes scheduling information about one or more future programs, based on the one or more future programs being similar to other programs that have been previously viewed at a time of day corresponding to the distinct time period or similar to the one or more programs of interest that have been selected for recording.

10. The method of claim 5 wherein the method is performed at a current time that is within the first time period, and wherein the method is performed automatically in response to a received request to present an electronic program guide for the current time.

11. The method of claim 5, further comprising:

receiving from a user indications of one or more attributes of programs of interest, and wherein at least one of the selected programs has an attribute that matches one of the indicated one or more attributes of programs of interest.

12. The method of claim 5 further comprising:

selecting, for a second time period that is different from the first time period, one or more future programs to be broadcast, each program of the one or more future programs for the second time period being scheduled for broadcast during the second time period, and having at least one attribute that is identical to one of the stored attributes of one of the plurality of broadcast video programs that have been viewed on the presentation device during a time of day that corresponds to the second time period or having at least one attribute that is identical to one of the stored attributes of the one or more programs of interest that have been selected for recording, at least some of the one or more future programs for the second time period being different from the one or more future programs for the first time period; and presenting on the presentation device an electronic program guide for the second time period.

13. The method of claim 5, further comprising:
receiving an indication that the electronic program guide is to operate as a lock by presenting only programs presented by the electronic program guide, the electronic program guide including only programs that are child friendly based on a maturity or genre attribute.

14. The method of claim 13, further comprising:
receiving an indication of a maturity attribute, wherein each program of the one or more future programs has a maturity attribute that is less than or equal to the indicated maturity attribute.

15. The method of claim 5, further comprising:
receiving an indication of a type of program that is not to be considered in the selection of the one or more future programs.

16. A non-transitory computer-readable medium whose contents enable a computing system to present information about available programming, by performing a method comprising:
storing one or more attributes of a plurality of broadcast video programs that have been viewed on a presentation device;
storing one or more attributes of one or more programs of interest that have been selected for recording;
selecting, for a first time period, one or more future programs to be broadcast, each program of the one or more future programs scheduled for broadcast during the first time period, and the selecting based on determining whether the one or more future programs to be broadcast, other than one of the plurality of broadcast video programs that have been viewed on the presentation device, has at least one attribute that is identical to one of the stored attributes of one of the plurality of broadcast video programs that have been viewed on the presentation device and determining whether the one or more future programs to be broadcast has at least one attribute that is identical to one of the stored attributes of the one or more programs of interest that have been selected for recording;
generating an electronic program guide for the first time period for presentation on the presentation device, the electronic program guide including scheduling information for the selected one or more future programs.

17. The non-transitory computer-readable medium of claim 16, wherein the method further comprises:
identifying at least one of the plurality of broadcast video programs that have been viewed on the presentation device, the at least one broadcast video programs having been viewed during a time of day that corresponds to the first time period; and
determining, for each program of the of one or more future programs, a measure of similarity between the future program and the identified at least one of the plurality of broadcast video programs or between the future program and the one or more programs of interest that have been selected for recording.

18. The non-transitory computer-readable medium of claim 16 wherein the method is performed for multiple distinct time periods, and wherein the generated electronic program guide for each of the multiple distinct time periods includes scheduling information about one or more future programs, based on the one or more future programs being similar to other programs that have been previously viewed at a time of day corresponding to the distinct time period or similar to the one or more programs of interest that have been selected for recording.

19. The non-transitory computer-readable medium of claim 16 wherein the computer-readable medium is a memory in the computing system, and wherein the contents are instructions that when executed cause the computing system to perform the method.

20. The non-transitory computer-readable medium of claim 16 wherein the computer-readable medium is part of a set-top box operable to receive digital program content from a communications network and to present the received digital program content on the presentation device.

* * * * *